(12) United States Patent  (10) Patent No.: US 7,490,972 B2
Kokogawa  (45) Date of Patent: Feb. 17, 2009

(54) SURFACE LIGHT SOURCE APPARATUS

(75) Inventor: Toru Kokogawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 7 days.

(21) Appl. No.: 11/509,738

(22) Filed: Aug. 25, 2006

(65) Prior Publication Data

US 2007/0053207 A1    Mar. 8, 2007

(30) Foreign Application Priority Data

Sep. 2, 2005   (JP) .............................. 2005-255366
Jun. 15, 2006  (JP) .............................. 2006-165962

(51) Int. Cl.
*F21V 7/04* (2006.01)

(52) U.S. Cl. ..................... 362/633; 362/614; 362/634

(58) Field of Classification Search ................. 362/611, 362/614, 628, 632, 633, 634, 217, 224, 225, 362/260, 362; 349/58, 60, 70

See application file for complete search history.

(56) References Cited

U.S. PATENT DOCUMENTS

| 6,108,060 A * | 8/2000 | Funamoto et al. ............. 349/65 |
| 6,231,202 B1 * | 5/2001 | Kozaka et al. ............... 362/614 |
| 7,036,973 B2 * | 5/2006 | Jeong ........................... 362/633 |
| 2004/0012971 A1 * | 1/2004 | Tsai et al. ..................... 362/390 |
| 2004/0062029 A1 * | 4/2004 | Ato ............................... 362/31 |
| 2006/0256583 A1 * | 11/2006 | Shimizu et al. ............. 362/633 |
| 2007/0013884 A1 | 1/2007 | Kim |

FOREIGN PATENT DOCUMENTS

| JP | 2000-194280 | 7/2000 |
| JP | 2001-35235 | 2/2001 |
| JP | 2002-133935 | 5/2002 |
| JP | 2003-29262 | 1/2003 |
| JP | 2004-327081 | 11/2004 |
| JP | 2004-327082 | 11/2004 |
| JP | 2005-327082 | 11/2004 |
| KR | 2001-0001119 | 1/2001 |
| KR | 2002-0032384 | 5/2002 |
| KR | 10-2005-0063581 | 6/2005 |

* cited by examiner

*Primary Examiner*—Bao Q Truong
(74) *Attorney, Agent, or Firm*—Oblon, Spivak, McClelland, Maier & Neustadt, P.C.

(57) ABSTRACT

A surface light source apparatus includes: a fluorescent discharge tube having a bent portion; a light guide plate which has a corner portion facing the bent portion; a rear frame which receives the light guide plate and is formed of a resin material; and a middle frame which is provided parallel with the rear frame and is formed of a resin material. The rear frame or the middle frame has a protrusion which is in contact with the corner portion. The bent portion of the fluorescent discharge tube is disposed in a gap between the protrusion and the side surface of the rear frame.

7 Claims, 7 Drawing Sheets

SURFACE LIGHT SOURCE APPARATUS

BACKGROUND OF THE INVENTION

1. Field of the Invention

The present invention relates to a surface light source apparatus used in a transmissive type or semi-transmissive type display device.

2. Background Art

In a conventional surface light source apparatus, a rubber holder is attached to a bent corner portion of a U-shaped fluorescent discharge tube and a light guide plate is attached adjacent to the rubber holder, as disclosed in JP-A-2000-194280.

In a liquid crystal display device disclosed in JP-A-2003-29262, a light guide plate is fixed by a protrusion formed on a metallic chassis, and an L-shaped fluorescent discharge tube is inserted between a rising portion of the metallic chassis and a fixed post included in a resin cabinet to hold the light guide plate and the L-shaped fluorescent discharge tube.

In an edge-light type backlight disclosed in JP-A-2001-35235, a light guide plate is positioned by a pawl formed by cutting and erecting a portion of a casing formed by processing metal such as aluminum, and the light guide plate and a U-shaped fluorescent discharge tube are received in the casing.

In the conventional lighting unit disclosed in JP-A-2000-194280, since the rubber holder is provided in the bent corner portion of the U-shaped fluorescent discharge tube, the tube wall temperature of the bent corner portion of the U-shaped fluorescent discharge tube is reduced to be lower than that of a portion, in which the rubber holder is not provided, by at least 5° C., due to heat transmission to a back cover and a casing.

In the liquid crystal display device disclosed in JP-A-2003-29262, since the L-shaped fluorescent discharge tube is inserted between the fixed post and the metallic chassis, the tube wall temperature of the fluorescent discharge tube is reduced due to heat transmission to the metallic chassis.

In the edge-light type backlight disclosed in JP-A-2001-35235, since the U-shaped fluorescent discharge tube is received in the casing formed of aluminum, the tube wall temperature of the fluorescent discharge tube is reduced due to the heat transmission to the casing.

Particularly, in a cold cathode fluorescent lamp (hereinafter, referred to as CCFL) which is a narrow tube having an outer diameter $\phi$ of about 2.4 mm (inner diameter: 1.8 mm), which is being employed so as to realize slimness, compactness and high brightness, mercury in the CCFL is condensed (unevenly distributed) at a bent corner portion of the U-shaped CCFL having a low temperature due to the characteristics thereof. Accordingly, the amount of mercury necessary for a light emitting portion lacks in the CCFL, and thus the lifetime of the CCFL is reduced to a short time such as several hundreds to several thousands hours (halving of initial brightness) even in a general use state. The tube wall temperature of a portion other than the bent corner portion is reduced and thus the brightness deteriorates due to the condensation (uneven distribution) of mercury.

SUMMARY OF THE INVENTION

In a surface light source apparatus according to the present invention, a rear frame or a middle frame formed of a resin material has a protrusion which is in contact with a corner portion of a light guide plate and a bent portion of a fluorescent discharge tube is disposed in a gap between the protrusion and the side surface of the rear frame.

In the present invention, since a rear frame or a middle frame formed of a resin material has a protrusion which is in contact with a corner portion of a light guide plate and a bent portion of a fluorescent discharge tube is disposed in a gap between the protrusion and the side surface of the rear frame, it is possible to obtain a surface light source apparatus which can support the light guide plate in an impact resistance test required in a liquid crystal display device without forming a rubber holder in the bent portion of the fluorescent discharge tube and prevent the fluorescent discharge tube from being damaged.

Even in general use, the tube wall temperature of the bent portion of the fluorescent discharge tube is not reduced to be lower than that of a light emission portion by at least 5° C. and mercury is not condensed (unevenly distributed) in the bent portion of the fluorescent discharge tube. Accordingly, it is possible to obtain a surface light source apparatus which has the sufficient amount of mercury in the light emission portion and prevents the lifetime from being reduced to a short time such as several hundreds to several thousands hours (halving of initial brightness).

BRIEF DESCRIPTION OF THE DRAWINGS

The present invention may be more readily described with reference to the accompanying drawings.

DETAILED DESCRIPTION OF THE PREFERRED EMBODIMENTS

First Embodiment

Figure 1:
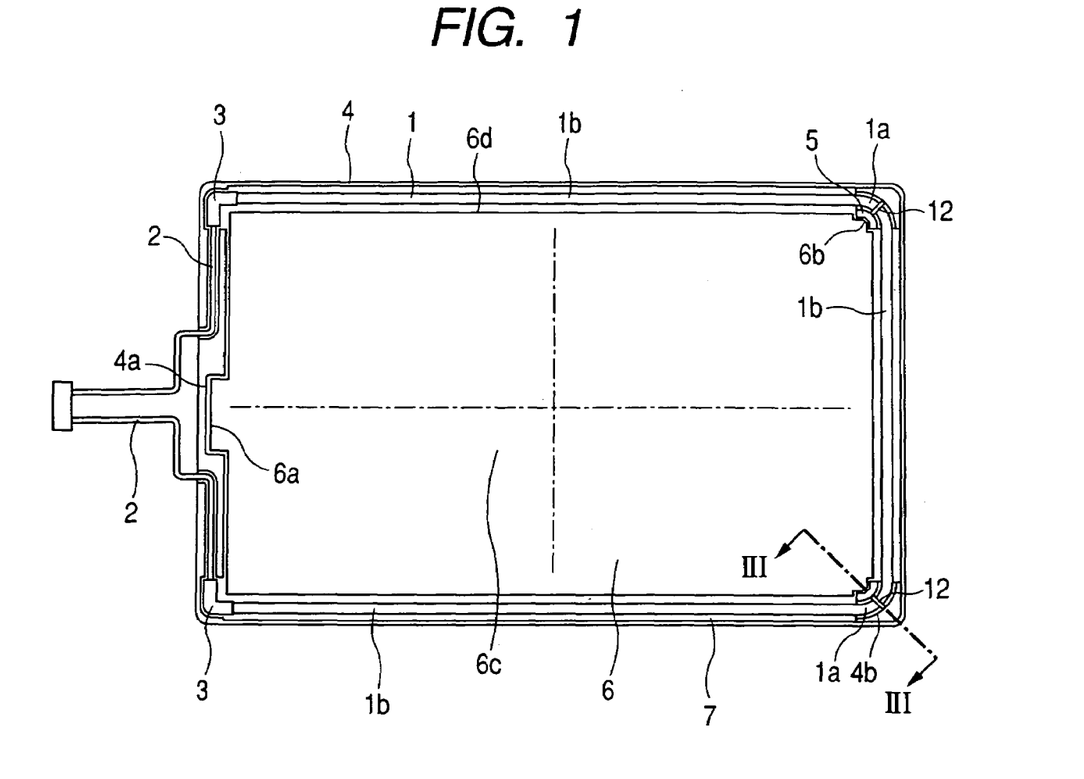
FIG. 1 is a plan view schematically showing the configuration of a surface light source apparatus according to a first embodiment of the present invention except a middle frame.
Figure 2:
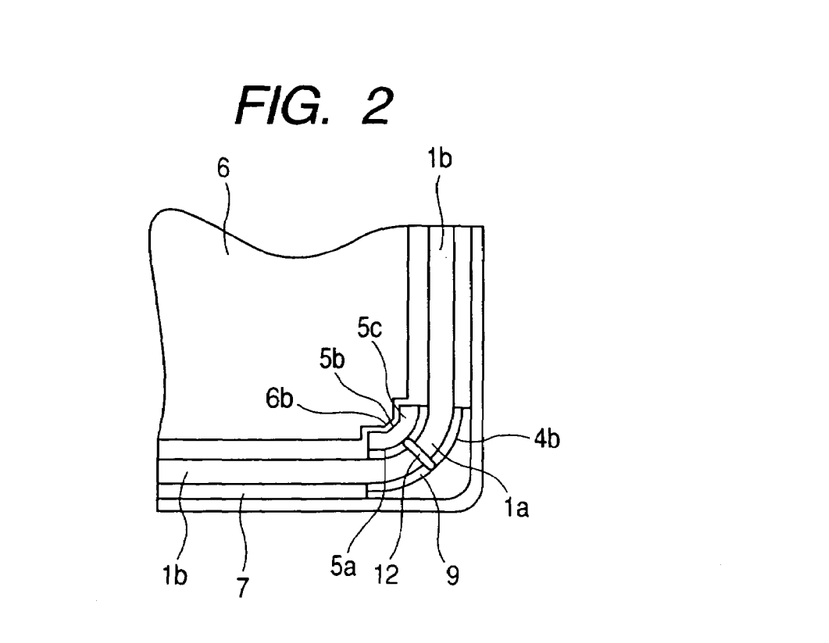
FIG. 2 is an enlarged view of the vicinity of a bent portion of a fluorescent discharge tube.
Figure 3:
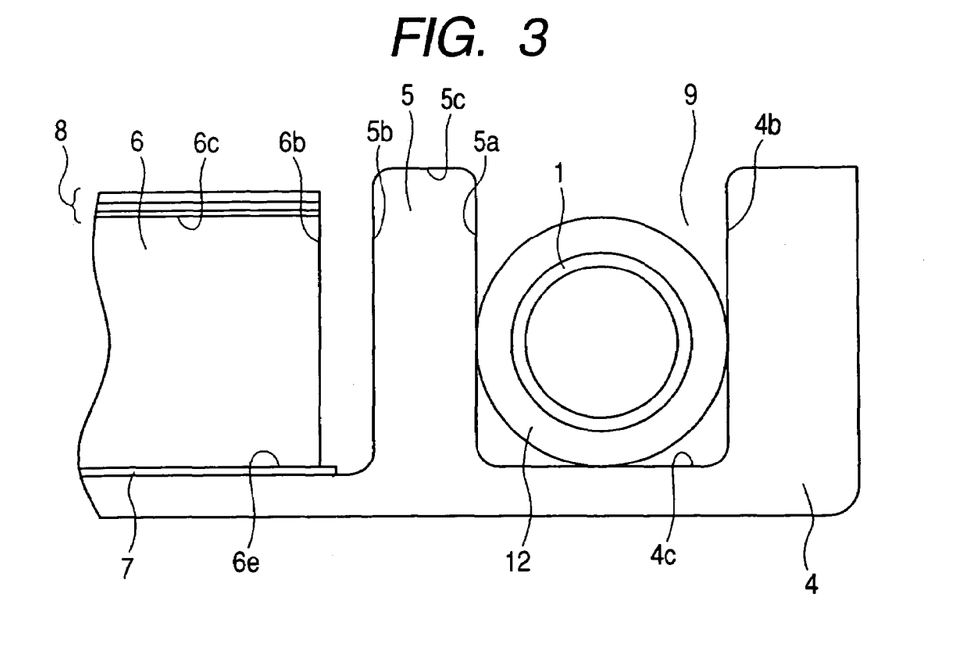
FIG. 3 is a partial cross-sectional view of the surface light source apparatus shown in FIG. 1 taken along line III-III.
Figure 4:
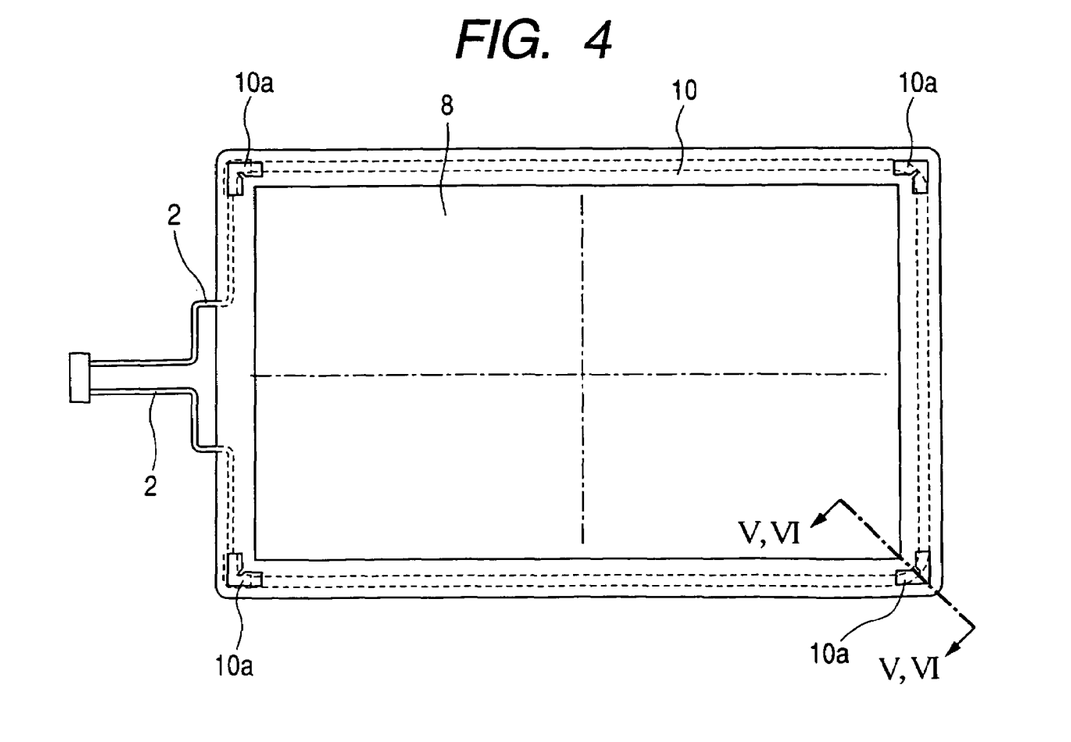
FIG. 4 is a plan view schematically showing the configuration of the surface light source apparatus according to the first embodiment of the present invention.
Figure 5:
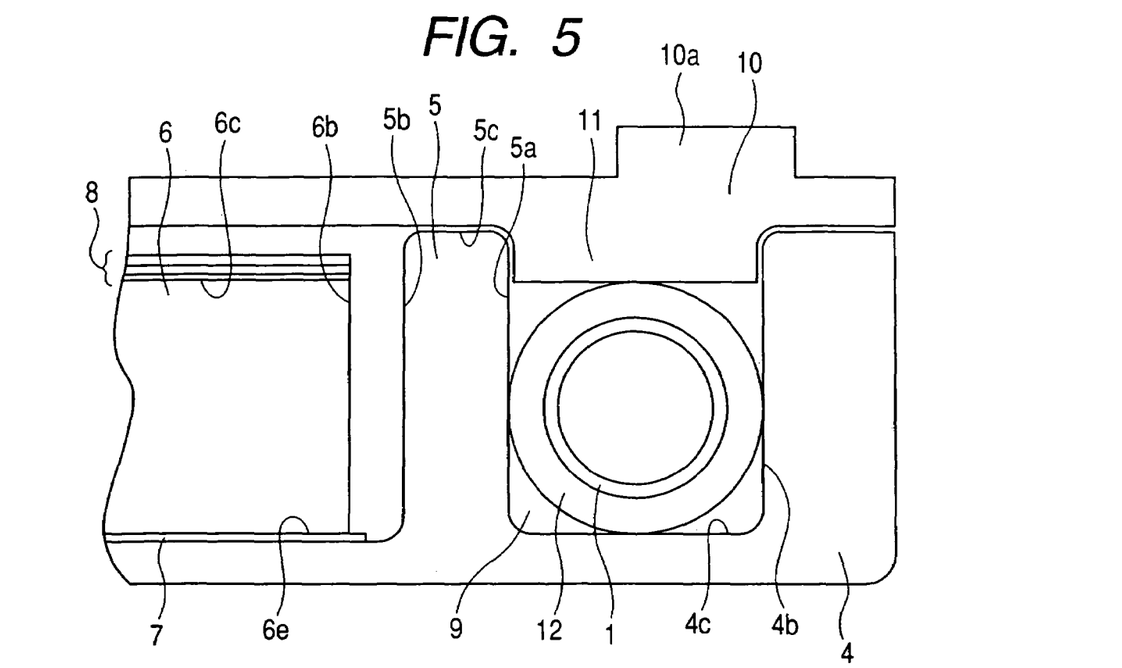
FIG. 5 is a partial cross-sectional view of the surface light source apparatus shown in FIG. 4 taken along line V-V.
Figure 6:
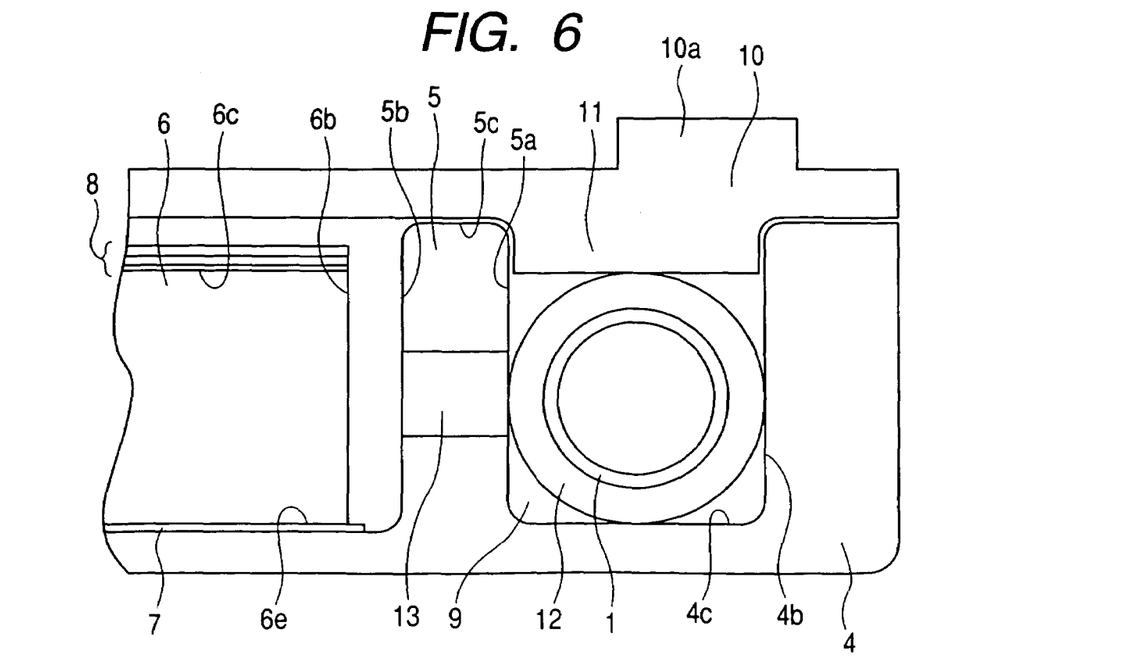
FIG. 6 is a partial cross-sectional view of the surface light source apparatus shown in FIG. 4, in which an opening is formed in a protrusion, taken along line VI-VI.
Figure 7:
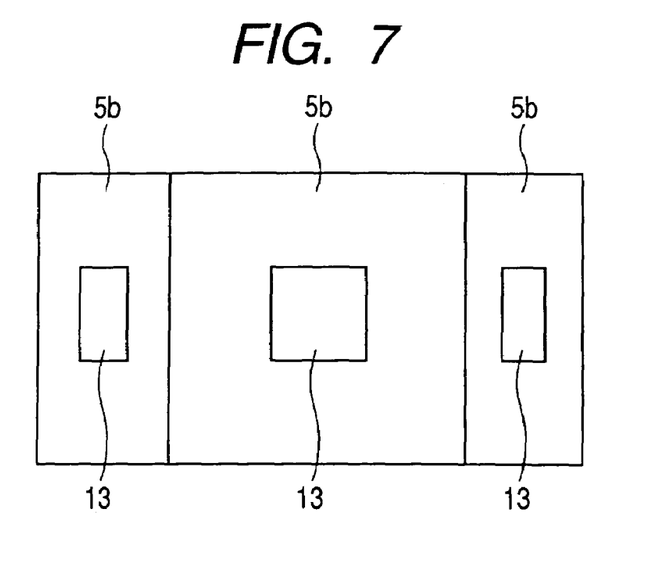
FIG. 7 is a front view of a contact surface of the protrusion shown in FIG. 6 when viewed from a light guide plate.

FIG. 1 is a plan view schematically showing the configuration of a surface light source apparatus according to a first embodiment of the present invention except a middle frame, FIG. 2 is an enlarged view of the vicinity of a bent portion of a fluorescent discharge tube, FIG. 3 is a partial cross-sectional view of the surface light source apparatus shown in FIG. 1 taken along line III-III, FIG. 4 is a plan view schematically showing the configuration of the surface light source apparatus according to the first embodiment of the present invention, FIG. 5 is a partial cross-sectional view of the surface light source apparatus shown in FIG. 4 taken along line V-V, FIG. 6 is a partial cross-sectional view of the surface light source apparatus shown in FIG. 4, in which an opening is formed in a protrusion, taken along line VI-VI, and FIG. 7 is a front view of a contact surface of the protrusion shown in FIG. 6 when viewed from a light guide plate.

Particularly, in a display device such as a car navigation system, in order to maintain slimness and compactness which are the characteristics of a liquid crystal display device and correspond to recent requirement for high brightness, for brightness improvement of an edge-light type surface light source apparatus which is advantageous to slimness, a U-shaped CCFL or a L-shaped CCFL (one or two in a diagonal arrangement) having a large light emission area is used in a light source of a surface light source apparatus. In the first embodiment, the U-shaped CCFL which is one of a fluorescent discharge tube will be described as the light source.

In FIGS. 1 to 7, a fluorescent discharge tube 1 which is the U-shaped CCFL has two bent portions 1a. Rubber holders 3 made of silicon resin are provided on electrode portions located on the both ends of the fluorescent discharge tube 1 to insulate and surround the electrode portions of the fluorescent discharge tube 1 such that a solder connection portion of a lead wire is not exposed. Since the electrode portions of the fluorescent discharge tube 1 are applied with a high voltage of at least 1 KV by alternating current having high frequency output from an inverter circuit so as to turn on the fluorescent discharge tube 1, the solder connection portion of the lead wire must not be exposed as safety countermeasure.

The rear frame 4 is made of a resin material such as polycarbonate and receives a light guide plate 6, a reflective sheet 7, optical sheets 8 and the fluorescent discharge tube 1.

In a method of holding the light guide plate 6 using the rear frame 4, a convex portion 6a of the light guide plate 6 is inserted into a concave portion 4a formed in the side, at which the electrode portion of the fluorescent discharge tube 1 is formed and to which light from the fluorescent discharge tube 1 is not input, with a predetermined clearance to restrict the Y-directional movement of the light guide plate 6. The X-directional and Y-directional movement of the light guide plate 6 is restricted by protrusions 5 which are protruded from the rear frame 4 in a Z direction and are in contact with corner portions 6b of the light guide plate 6 facing two bent portions 1a of the fluorescent discharge tube 1. The longitudinal direction of an upper surface 6c which is the display surface of the light guide plate 6 is the X direction, the width direction of the upper surface 6c of the light guide plate 6 is the Y direction, and the vertical direction of the upper surface 6c of the light guide plate 6 is the Z direction.

The bent portion 1a of the fluorescent discharge tube 1 is disposed in a gap 9 of the protrusion 5, and the side surface 4b of the rear frame 4 and a straight-line portion 1b of the fluorescent discharge tube 1 is disposed at the side surface 6d of the light guide plate 6, thereby inputting the light emitted from the fluorescent discharge tube 1 from the side surface 6d in the vicinity of the fluorescent discharge tube 1 to the light guide plate 6. The light guide plate 6 propagates the light such that the light from the fluorescent discharge tube 1 is uniformly emitted from the upper surface 6c of the display surface in the plane.

The light guide plate 6 may be a resin plate such as polyethylene terephthalate (PET) having a refractive index of about 1.4 to 1.6, acrylic (PMMA), polycarbonate (PC) or cycloolefin or a glass substrate having a light transmitting function. More specifically, when polycarbonate or cycloolefin resin is used, the size variation of the light guide plate 6 due to temperature variation is reduced and thus the light guide plate 6 can be used in a wider temperature range.

The reflective sheet 7 is disposed on the bottom surface 6e of the light guide plate 6 and the outer circumference of the fluorescent discharge tube 1 except the bent portions of the fluorescent discharge tube 1. The reflective sheet 7 is disposed between the light guide plate 6 and the rear frame 4 and serves to efficiently input the light from the fluorescent discharge tube 1 to the light guide plate 6 and to input the light emitted from the bottom surface 6e (opposite side of the liquid crystal display panel) of the light guide plate 6 to the light guide plate 6 again.

The reflective sheet 7 is made of a mixture of polypropylene (PP) or polyethylene terephthalate (PET) and a barium sulfate or titanium oxide resin having minute bubbles, a metal plate deposited with silver, or a metal plate coated with a pigment containing titanium oxide. In order to suppress reflective loss of the reflective surface, the reflectivity of the reflective sheet 7 is preferably at least 90%.

The rear frame 4 is a resin material such as polycarbonate (PC) or ABS. Since the resin material has heat conductivity lower than that of metal, when the rear frame 4 is made of the resin material, the tube wall temperature of the fluorescent discharge tube 1 is prevented from being reduced and the amount of mercury necessary for the light emitting portion can be ensured. It is preferable that the material of the rear frame 4 is made of the reflective material or a white pigment is coated on the inside of the rear frame 4 to increase the reflectivity, because the reflection of the inside is improved and the loss of the light emitted from the light source is reduced. It is preferable that the rear frame 4 also functions as the reflective sheet 7, because the number of the members can be reduced.

The optical sheets 8 made of a plurality of optical sheets for efficiently using the light is disposed on the upper surface 6c (the side of the liquid crystal display panel) of the light guide plate 6, and the below-described liquid crystal display panel is disposed on the light guide plate 6 through the optical sheets 8 therebetween.

The optical sheets 8 are formed by inserting a lens sheet between diffusion sheets. When the brightness must be improved, a plurality of lens sheets for improving the front brightness are combined in consideration of the prism direction of the sheet formed on the surface thereof. When the diffusion must be improved, at least two diffusion sheets can be used. One lens sheet may be used or may not be used according to the light distribution of the lens sheet. Alternatively, a protective sheet, a lens sheet or a polarization sheet may be combined or may not be used. The configuration of the optical sheets is preferably optimized in consideration of the brightness to be obtained or the light distribution characteristics.

A middle frame 10 is provided parallel with the rear frame 4 to insert the light guide plate 6 and positions the optical sheets 8 disposed on the upper surface 6c of the light guide plate 6 at the outer circumference of the light emission region of the surface light source apparatus. A rib 10a for positioning the liquid crystal display panel (not shown) is provided on the middle frame 10.

The middle frame 10 has a convex portion 11 at a portion corresponding to the gap 9 between the protrusion 5 and the side surface 4b of the rear frame 4, and the convex portion 11 is fitted between the side surface 4b of the rear frame 4 and the protrusion 5 such that the protrusion 5 is supported by the rear frame 4 through the convex portion 11 against impact from the light guide plate to the protrusion 5.

The middle frame 10 is made of a resin material such as polycarbonate (PC) or ABS, similar to the rear frame 4. Since the resin material has heat conductivity lower than that of metal, when the middle frame 10 is made of the resin material, the tube wall temperature of the fluorescent discharge tube 1 is prevented from being reduced and the amount of mercury necessary for the light emitting portion can be ensured.

When the size of a display region increases without changing the outer dimension of the liquid crystal display device or the outer dimension of the liquid crystal display device decreases without changing the size of the display region and the protrusion 5 of the first embodiment is provided on the inside of the rubber holder provided in the bent portion 1a of the conventional fluorescent discharge tube 1, the size of the light emission region of the light guide plate 6 is smaller than the dimension of the liquid crystal display device by the widths of the bent portion 1a and the rubber holder and thus the size of the display region of the liquid crystal display device cannot increase.

In the conventional structure having the rubber holder in the bent portion 1a of the fluorescent discharge tube 1, in order to enlarge the display region, the fluorescent discharge tube 1 is narrow and the width of the rubber holder is small. However, in this case, the uneven distribution of mercury becomes serious and thus the lifetime required in the liquid crystal display device cannot be ensured.

In order to increase the dimension of the light emission region of the light guide plate 6 without narrowing the fluorescent discharge tube 1, the width of the protrusion 5 disposed on the inside of the rubber holder disposed in the bent portion 1a of the fluorescent discharge tube 1 may be reduced. However, in this case, the light guide plate cannot be supported in an impact resistance test required in the liquid crystal display device, and thus the fluorescent discharge tube 1 is destroyed.

It is difficult to increase the dimension of the display region without changing the dimension of the liquid crystal display device or to decrease the dimension of the liquid crystal display device without changing the dimension of the display region using the bent portion 1a and the rubber holder of the bent portion 1a together. However, in the first embodiment, since the protrusion 5 is supported by the convex portion 11, even when the width of the protrusion 5 is small, the movement of the light guide plate 6 due to the impact test is suppressed and the protrusion 5 can ensure sufficient strength. The light guide plate 6 can be disposed as near as possible to the inside of the bent portion 1a of the fluorescent discharge tube 1, and thus the dimension of the display region can increase without changing the dimension of the liquid crystal display device or the dimension of the liquid crystal display device can decrease without changing the dimension of the display region.

An O-ring 12 is made of a resin material such as silicon or the like and prevents the tube wall (glass) of the fluorescent discharge tube 1 from directly coming into contact with the rear frame 4 or the middle frame 10 to properly maintain the position of the fluorescent discharge tube 1.

The position, the number and the outer diameter of the O-ring 12 are properly selected to properly maintain the position of the fluorescent discharge tube 1. In the first embodiment, the O-rings 12 are disposed in the gaps 9 between the protrusion 5 and the side surface 4b of the rear frame 4, that is, the two bent portions 1a of the fluorescent discharge tube 1.

In the first embodiment, the protrusion 5 of the rear frame 4 includes at least a curved surface 5a having a shape following the bent portion 1a of the fluorescent discharge tube 1 (substantially equal to the radius of curvature of the inside of the bent portion of the fluorescent discharge tube 1), a contact surface 5b fitted with the corner portion 6b of the light guide plate 6 and an upper surface 5c which is in contact with the middle frame 10. However, the protrusion 5 is not limited to this shape.

For example, if the protrusion 5 is not in contact with the fluorescent discharge tube 1, the curved surface 5a may be a flat surface. However, if the O-ring 12 is disposed in the gap 9 between the protrusion 5 and the side surface 4b of the rear frame 4, it is preferable that the curved surface 5a and the side surface 4b are formed in a shape following the bent portion 1a of the fluorescent discharge tube 1, because the O-ring 12 can be fitted in any portion of the gap 9.

When the convex portion 11 of the middle frame 10 can be fitted between the side surface 4b of the rear frame 4 and the protrusion 5, the protrusion 5 may have a height in which the upper surface 5c is not in contact with the middle frame 10. However, as the contact area between the protrusion 5 and the convex portion 11 is wide, the strength of the protrusion 5 increases. Accordingly, the upper surface 5c of the protrusion 5 is preferably in contact with the middle frame 10.

In the first embodiment, the O-ring 12 disposed in the bent portion 1a of the fluorescent discharge tube 1 is in contact with the side surface 4b and the bottom surface 4c of the rear frame 4, the protrusion 5 and the convex portion 11 of the middle frame 10 to restrict the movement of the fluorescent discharge tube 1 in the X direction, the Y direction and the Z direction.

Although the protrusion 5 formed on the rear frame 4 located at the bent portion 1a of the fluorescent discharge tube 1 shields the light from the fluorescent discharge tube 1 in the first embodiment, as shown in FIGS. 6 and 7, an opening 13 is provided in the protrusion 5 such that the light from the fluorescent discharge tube 1 is input to the corner portion 6b of the light guide plate 6 through the opening 13. Thus, a dark portion is prevented from being formed in the corner portion 6b of the light guide plate 6. The shape, the number and the size of the opening 13 are properly selected in consideration of the dark portion of the corner portion 6b and the strength of the protrusion 5.

When the fluorescent discharge tube 1, the light guide plate 6, the reflective sheet 7 and the optical sheets 8 are received in the rear frame 4 and the middle frame 10, it is possible to configure the surface light source apparatus for emitting the light emitted from the fluorescent discharge tube 1 of the light source to the display surface in a surface shape.

Although a liquid crystal display panel using birefringence of liquid crystal or a printed material in which characters or drawings are printed on a transparent plate may be used as the display panel (not shown) disposed above the surface light source apparatus, the liquid crystal display panel is used as the display panel in the first embodiment.

The liquid crystal display panel includes a TFT array substrate configured by forming a thin film transistor (hereinafter, referred to as TFT) which is a switching element, electrodes such as pixel electrodes and wirings on a glass substrate which is a first substrate, a color filter substrate (hereinafter, referred to as a CF substrate) configured by forming a coloring layer on a glass substrate which is a second substrate, a spacer for holding the first substrate and the second substrate at a uniform gap, a seal material for adhering the first substrate and the second substrate, a sealing material for sealing the first substrate and the second substrate after injecting liquid crystal between the first substrate and the second substrate, an alignment film for applying initial alignment to the liquid crystal, a first polarization plate disposed on the bottom surface of the first substrate, and a second polarization plate disposed on the upper surface of the second substrate. In the first embodiment, the existing liquid crystal display panel is used and thus their detailed description will be omitted.

The display device is configured by providing a circuit board for driving the liquid crystal display panel and positioning the liquid crystal display panel on the surface light source apparatus in a front frame and the rear frame 4.

Next, a procedure of assembling the surface light source apparatus in the first embodiment will be described.

First, the fluorescent discharge tube 1 is inserted into two O-rings 12 and the two O-rings are disposed on the two bent portions 1a.

Next, the lead wire 2 and the electrode portions of the both ends of the fluorescent discharge tube 1 are solder-connected.

Since a high voltage is applied to the electrode portions of the fluorescent discharge tube 1, the electrode portions must be properly insulated. Accordingly, the rubber holder 3 is provided to surround the electrode portions of the both ends of the fluorescent discharge tube 1 and the solder connection portion.

The reflective sheet 7 is inserted into the rear frame 4 and the fluorescent discharge tube 1 in which the lead wire 2 and the rubber holder 3 are mounted is disposed on the reflective sheet 7.

The bent portion 1a of the fluorescent discharge tube 1 is inserted into the gap 9 between the protrusion 5 and the side surface 4b of the rear frame 4 such that O-ring 12 is brought into contact with the side surface 4b and the bottom surface 4c of the rear frame 4 and the curved surface 5a of the protrusion 5.

The corner portion 6b of the light guide plate 6 is brought into contact with the contact surface 5b of the protrusion 5 and the convex portion 6a of the light guide plate 6 is inserted into the concave portion 4a of the rear frame 4, thereby mounting the light guide plate 6 in the rear frame 4.

The optical sheets 8 are guided to a predetermined rib formed on the rear frame 4 and provided on the upper surface 6c of the light guide plate 6.

Finally, the middle frame 10 is fitted with the plurality of pawls formed on the circumference of the frame and fixed to the rear frame 4, thereby completing the surface light source apparatus.

The convex portion 11 of the middle frame 10 is inserted into the gap 9 between the protrusion 5 and the side surface 4b of the rear frame 4 such that the convex portion 11 of the middle frame 10 is fitted between the protrusion 5 and the side surface 4b of the rear frame 4. Accordingly, the O-ring 12 is brought into contact with the convex portion 11 of the middle frame 10, the side surface 4b and the bottom surface 4c of the rear frame 4 and the curved surface 5a of the protrusion 5, and the fluorescent discharge tube 1 is positioned in the rear frame 4 and the middle frame 10 by the O-rings 12 disposed in the bent portions 1a and the rubber holders 3 disposed in the electrode portions of the fluorescent discharge tube 1.

Figure 8:
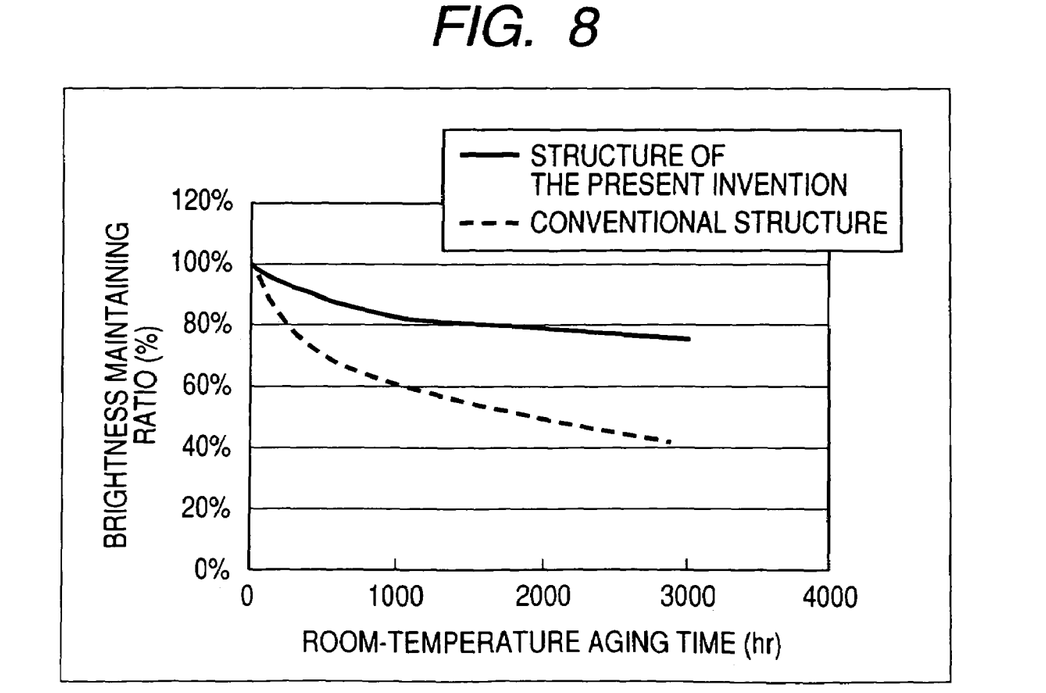
FIG. 8 is a view showing the result of measuring brightness lifetime property when only an O-ring 12 is provided in a bent portion 1a of a fluorescent discharge tube 1 and when a rubber holder is provided in the bent portion.

FIG. 8 is a view showing the result of measuring the brightness lifetime characteristics when only the O-ring 12 is disposed in the bent portion 1a of the fluorescent discharge tube 1 according to the first embodiment and when the rubber holder is provided in the bent portion of the fluorescent discharge tube according to the conventional structure. A solid line denotes the brightness lifetime characteristics of the surface light source apparatus according to the first embodiment, and a dotted line denotes the brightness lifetime characteristics of the conventional surface light source apparatus.

According to FIG. 8, it can be seen that, when the rubber holder is provided in the bent portion of the fluorescent discharge tube according to the conventional structure, an initial brightness is halved when a room-temperature aging time is about 2000 hours.

In contrast, in the first embodiment, when the O-ring 12 is disposed in the bent portion 1a of the fluorescent discharge tube 1, the brightness is reduced to about 80% of the initial brightness although the room-temperature aging time is about 200 hours. Thus, it can be seen that the brightness lifetime characteristics is greatly improved in the present invention.

Figure 9:
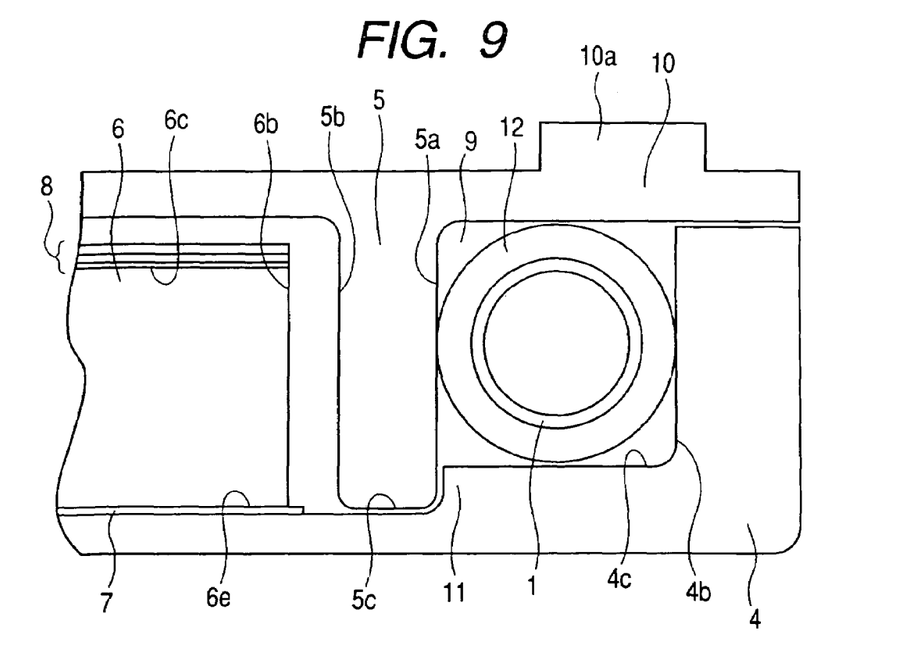
FIG. 9 is a partial cross-sectional view of the surface light source apparatus shown in FIG. 4, in which the portions on which the protrusion and the convex portion are formed are changed, taken along line IX-IX.

Although the protrusion 5 is integrally formed on the rear frame 4 and the convex portion 11 is integrally formed on the middle frame 10 in the first embodiment, as shown in FIG. 9, even when the convex portion 11 may be integrally formed on the rear frame 4 and the protrusion 5 may be integrally formed on the middle frame 10, the same effect is obtained. That is, the middle frame 10 has the protrusion 5 which is in contact with the corner portion 6b of the light guide plate 6 and the bent portion 1a of the fluorescent discharge tube 1 is disposed in the gap 9 between the protrusion 5 and the side surface 4b of the rear frame 4. The rear frame 4 has the convex portion 11 at the portion corresponding to the gap 9 between the protrusion 5 and the side surface 4b of the rear frame 4, and the convex portion 11 is fitted between the protrusion 5 and the side surface 4b of the rear frame 4. FIG. 9 is a partial cross-sectional view of the surface light source apparatus shown in FIG. 4 in which the portions on which the protrusion and the convex portion are formed are changed, taken along line IX-IX.

As described above, in the surface light source apparatus according to the first embodiment, since the rear frame 4 has the protrusion 5 which is in contact with the corner portion 6b of the light guide plate 6 and the bent portion 1a of the fluorescent discharge tube 1 is disposed in the gap 9 between the protrusion 5 and the side surface 4b of the rear frame 4, it is possible to obtain the surface light source apparatus which can support the light guide plate 6 in the impact resistance test required in the liquid crystal display device without forming the rubber holder 3 in the bent portion 1a of the fluorescent discharge tube 1 and prevent the fluorescent discharge tube 1 from being damaged.

Even in the general use, the tube wall temperature of the bent portion 1a of the fluorescent discharge tube 1 is not reduced to be lower than that of the light emission portion by at least 5° C. Accordingly, since mercury in the fluorescent discharge tube 1 is not condensed (unevenly distributed) in the bent portion 1a of the fluorescent discharge tube 1 by the characteristics thereof and mercury does not lack in the light emission portion, it is possible to obtain the surface light source apparatus having improved brightness lifetime characteristics compared with the conventional surface light source apparatus.

Since the rear frame 4 and the middle frame 10 are formed of the resin material having the heat conductivity lower than that of metal, it is possible to prevent the tube wall temperature of the fluorescent discharge tube 1 from being reduced and to ensure the amount of mercury necessary for the light emission portion.

Second Embodiment

Figure 10:
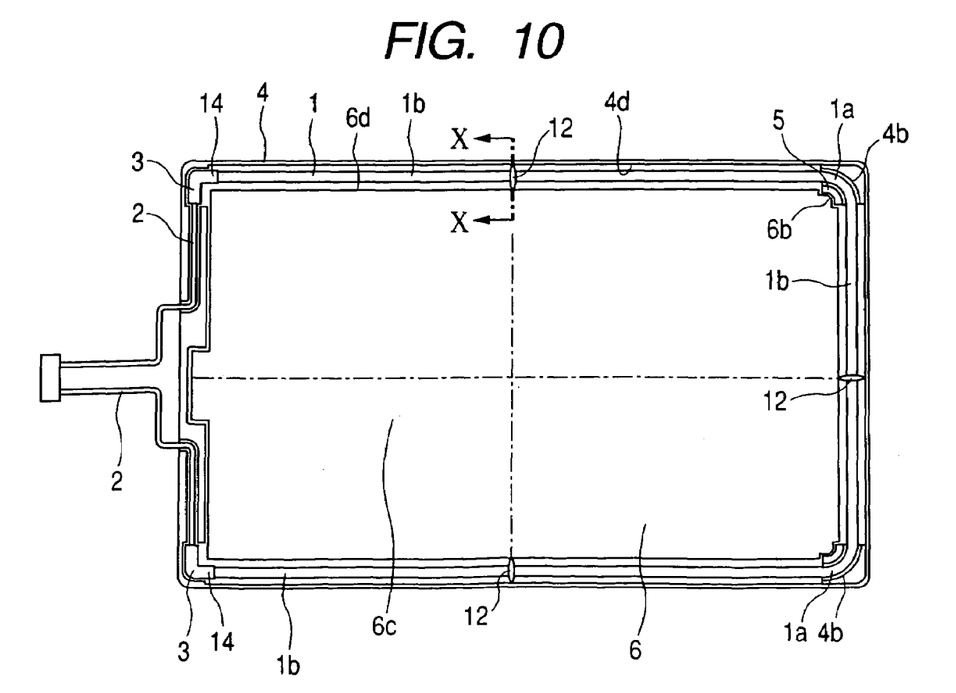
FIG. 10 is a plan view schematically showing a surface light source apparatus according to a second embodiment except a middle frame.
Figure 11A:
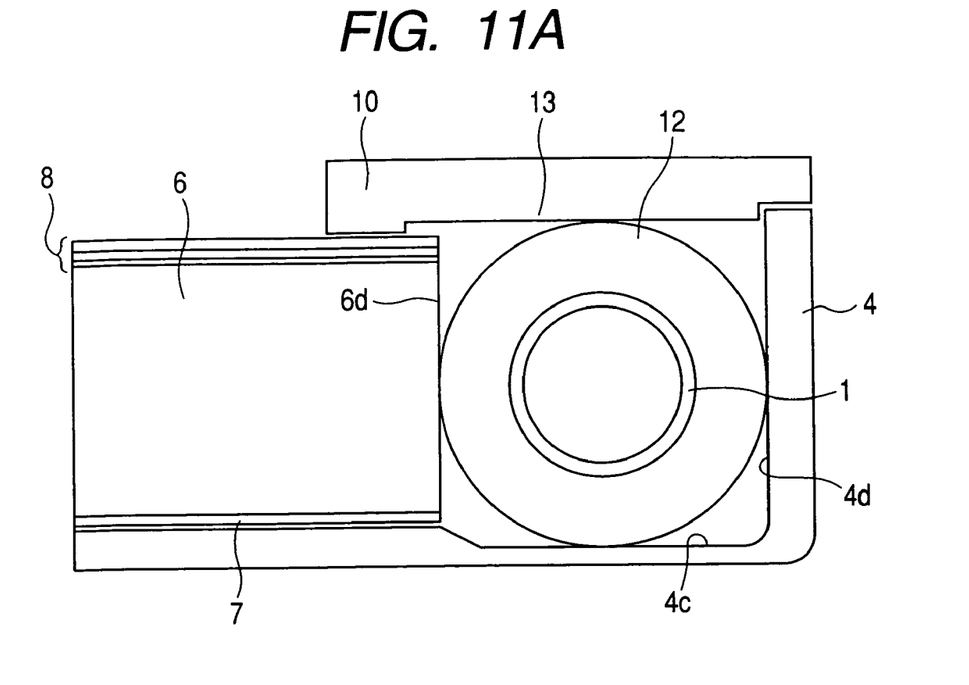
FIGS. 11A and 11B are partial cross-sectional views of the surface light source apparatus shown in FIG. 10 taken along line X-X.
Figure 11B:
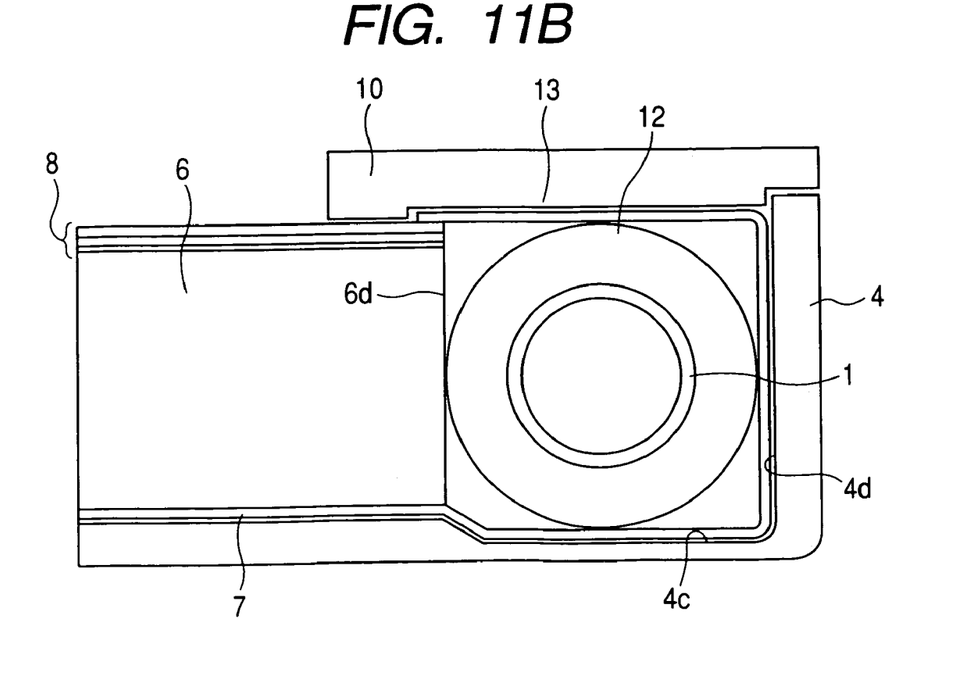

FIG. 10 is a plan view schematically showing the configuration of a surface light source apparatus according to another embodiment of the present invention except the middle frame 10, and FIGS. 11A and 11B are cross-sectional views of the surface light source apparatus shown in FIG. 10 including the middle frame 10, taken along line X-X. Although the O-ring is disposed in the bent portion 1a of the U-shaped fluorescent discharge tube 1, as shown in FIGS. 11A and 11B, the O-ring maybe disposed in a straight-line portion 1b of the fluorescent discharge tube 1. The second embodiment is different from the first embodiment in that the O-ring 12 is provided in the straight-line portion 1b of the fluorescent discharge tube 1. The other configuration is similar to that of the first embodiment.

In FIG. 10 and FIG. 11A, the O-ring 12 is disposed in the straight-line portion 1b of the fluorescent discharge tube 1 facing the light guide plate 6 except the bent portion 1a. The O-ring 12 is provided to be not interfered with the protrusion 5 of the rear frame 4 formed along the bent portion 1a of the fluorescent discharge tube 1 and is in contact with the side surface 4d and the bottom surface 4c of the rear frame 4 for holding the straight-line portion 1b of the fluorescent discharge tube 1 and the support portion 13 formed in the middle frame 10. As described above, since the light guide plate 6 can restrict the movement of the light guide plate 6 by the protrusion 5 formed on the corner portion of the rear frame 4, the O-ring 12 maybe disposed such that the light guide plate 6 is separated from the side surface 6d facing the straight-line portion 1b of the fluorescent discharge tube 1 by a uniform clearance or in contact with the side surface 6d. At least one O-ring 12 is disposed in each straight-line portion 1b so as to restrict the movement of the fluorescent discharge tube 1 in the X direction, the Y direction and the Z direction, as shown in FIG. 10. As shown in FIG. 11B, the reflective sheet 7 may be provided in the straight-line portion 1b of the fluorescent discharge tube 1 to surround the fluorescent discharge tube 1. By this configuration, it is possible to efficiently input the light emitted from the fluorescent discharge tube 1 to the light guide plate 6. In this case, the O-ring 12 is set to be in contact with the support portion 13 formed in the middle frame 10 and the side surface 4d and the bottom surface 4c of the rear frame 4 through the reflective sheet 7.

In the fluorescent discharge tube 1 having an outer diameter of Φ2.6 mm or less, the glass thickness of the tube wall is 0.3 mm or less, the cross sectional shape of the bent portion 1a is flat in the bending central portion, and the Y-directional height of the bent portion 1a is larger than the straight-line portion 1b by about 0.4 mm. Accordingly, when the O-ring 12 is disposed in the bent portion 1a as shown in the first embodiment, the cross-sectional Y-directional height of the fluorescent discharge tube 1 becomes higher and thus the surface light source apparatus thickens. Accordingly, as shown in FIG. 11, by disposing the O-ring 12 in the straight-line portion 1b of the fluorescent discharge tube 1 instead of the bent portion 1a, it is possible to realize the slimness of the surface light source apparatus.

As described above, in the surface light source apparatus according to the second embodiment, since the protrusion 5 is formed in the corner portion of the rear frame 4 to restrict the movement of the light guide plate 6 without forming the rubber holder 3 in the bent portion 1a of the fluorescent discharge tube 1 and the O-ring 12 is disposed in the straight-line portion 1b of the fluorescent discharge tube 11, it is possible to obtain the surface light source apparatus which can support the light guide plate 6 in the impact resistance test required in the liquid crystal display device and prevent the fluorescent discharge tube 1 from being damaged.

Since the rubber holder 3 is not disposed in the bent portion 1a of the fluorescent discharge tube 1, mercury is not condensed (unevenly distributed) in the bent portion 1a of the fluorescent discharge tube 1. Accordingly, it is possible to obtain the surface light source apparatus having improved brightness lifetime characteristics compared with the conventional surface light source apparatus.

Since the rear frame 4 and the middle frame 10 are formed of the resin material having the heat conductivity lower than that of metal, it is possible to prevent the tube wall temperature of the fluorescent discharge tube 1 from being reduced and to ensure the amount of mercury necessary for the light emission portion.

Figure 12:
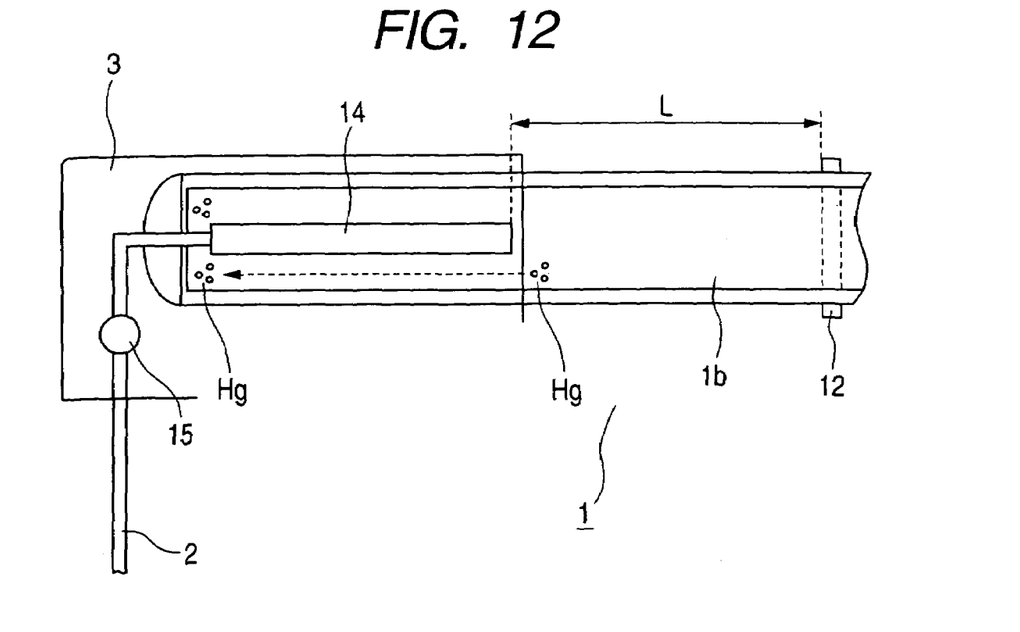
FIG. 12 is an enlarged view of main portions in the vicinity of an electrode portion 14 of a fluorescent discharge tube 1 shown in FIG. 10.

FIG. 12 shows a modified example of the second embodiment and is an enlarged view of main portions in the vicinity of the electrode portion 14 of the fluorescent discharge tube 1 shown in FIG. 10. The movement of mercury which exists in the vicinity of the electrode portion 1 will be described with reference to FIG. 12. In FIG. 12, the electrode portions 14 of the fluorescent discharge tube 1 is surrounded by the rubber holders 3 such that the solder connection portion 15 connected to the lead wire 2 is not exposed. The heat is radiated from the vicinities of the electrode portions 14 located at the both ends of the fluorescent discharge tube 1 when the fluorescent discharge tube is turned on, but the temperature of the electrode portions 14 is rapidly reduced by heat transmission to the solder connection portion connected to the lead wire 2 just after the fluorescent discharge tube 1 is turned off and mercury Hg moves to the lead wire 2 of the electrode portion 14 of which the temperature is reduced. Accordingly, when the fluorescent discharge tube is repeatedly turned on/off, mercury Hg moves to the lead wire 2 of the electrode portion 14 and is finally condensed (unevenly distributed). Accordingly, a needed amount of mercury Hg necessary for the light emission portion may not be ensured and the brightness may be reduced. In order to prevent this problem, the O-ring 12 is disposed in the light emission portion of the electrode portion 14. The O-ring 12 is disposed in the straight-line portion 1b such that the distance L from the end of the light emission portion of the electrode portion 14 is in a range from 5 mm to 50 mm. Since the O-ring 12 is disposed, the tube wall temperature of the light emission portion in the vicinity of the electrode portion 14 can be set to be low, it is possible to prevent mercury Hg from moving to the lead wire 2 due to the rapid reduction of the temperature just after the fluorescent discharge tube is turned off and to prevent the brightness from being rapidly reduced by ensuring the amount of mercury Hg in the light emission portion. When the distance L for disposing the O-ring 12 is in the range from 5 mm to 50 mm, it is possible to efficiently reduce the tube wall temperature of the light emission portion in the vicinity of the electrode portion 14.

Figure 13:
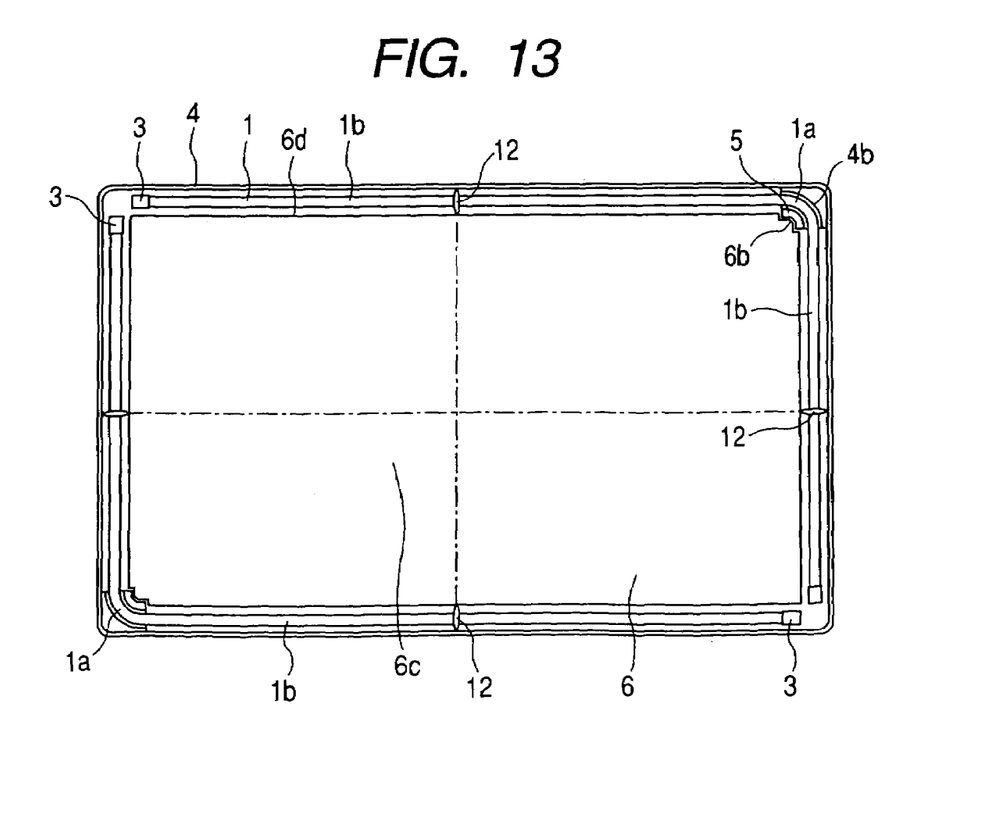
FIG. 13 is a plan view schematically showing the surface light source apparatus according to the second embodiment except the middle frame.

Although the U-shaped fluorescent discharge tube is used in the second embodiment, two L-shaped fluorescent discharge tubes may be disposed as shown in FIG. 13. As shown in FIG. 13, when the two L-shaped fluorescent discharge tubes 1 are diagonally disposed, two protrusions of the rear frame 4 are formed along the bent portions 1a of the fluorescent discharge tube 1. At least one O-ring is on each straight-line portion of the fluorescent discharge tube 1. The position and the number of the protrusions 5 of the rear frame 4 and the position and the number of the O-rings 12 can be freely set according to the shape (and the number) of the fluorescent discharge tube 1. Although the two L-shaped fluorescent discharge tubes 1 are disposed in the present modified example, one L-shaped fluorescent discharge tube may be disposed. In this case, as described above, the position and the number of the protrusions 5 of the rear frame 4 and the position and the number of the O-rings 12 can be properly set.

What is claimed is:

1. A surface light source apparatus comprising:
   a fluorescent discharge tube having a bent portion;
   a light guide plate which has a corner portion facing the bent portion;
   a rear frame which receives the light guide plate and is formed of a resin material; and
   a middle frame which is provided parallel with the rear frame and is formed of a resin material,
   wherein:
   at least one of the rear frame and the middle frame has a protrusion provided between the corner portion and the bent portion, and
   the bent portion of the fluorescent discharge tube is disposed in a gap between the protrusion and the side surface of the rear frame;
   at least one of the middle frame and the rear frame has a convex portion at a position corresponding to the gap, and
   the convex portion is inserted between the protrusion and the side surface of the rear frame.

2. The surface light source apparatus according to claim 1, wherein the protrusion includes an opening.

3. A surface light source apparatus comprising:
   a fluorescent discharge tube having a bent portion;
   a light guide plate which has a corner portion facing the bent portion;
   a rear frame which receives the light guide plate and is formed of a resin material; and
   a middle frame which is provided parallel with the rear frame and is formed of a resin material,
   wherein at least one of the rear frame and the middle frame has a protrusion which is in contact with the corner portion,
   wherein the bent portion of the fluorescent discharge tube is disposed in a gap between the protrusion and the side surface of the rear frame,
   wherein the bent portion of the fluorescent discharge tube is spaced from the protrusion and the side surface of the rear frame by at least one O-ring surrounding the bent portion,
   wherein at least one of the middle frame and the rear frame has a convex portion at a position corresponding to the gap, and
   wherein the convex portion is inserted between the protrusion and the side surface of the rear frame.

4. The surface light source apparatus according to claim 3, wherein the rear frame comprises more than one protrusion which protrusions include corresponding openings.

5. A surface light source apparatus comprising:
   (a) a U-shaped fluorescent discharge tube having an outer circumference, a bottom portion, two leg portions, and a bent portion connecting each of the leg portions to the bottom portion;
   (b) a rubber holder provided on an electrode portion located on the end of each of the leg portions remote from the bottom portion to insulate and surround the electrode portions such that a solder connection portion of a lead wire is not exposed;
   (c) a light guide plate which has two corner portions, one facing each of the bent portions;
   (d) a rear frame which receives the light guide plate and which has a side surface projecting from its rear surface adjacent each of the bent portions of the U-shaped fluorescent discharge tube; and
   (e) a middle frame which is provided parallel with the rear frame to insert the light guide plate and to position optical sheets disposed on the upper surface of the light guide plate,
   wherein:
   (f) the rear frame has protrusions which are in contact with each of the corner portions of the light guide plate;
   (g) the bent portions of the fluorescent discharge tube are disposed in corresponding gaps between the protrusions of the rear frame and the side surfaces of the rear frame; and
   (h) each of the bent portions of the fluorescent discharge tube is spaced from the corresponding protrusion of the rear frame and the corresponding side surface of the rear frame by an O-ring which completely surrounds the corresponding bent portion of the U-shaped fluorescent discharge tube, which is in line contact with the outer circumference of the corresponding bent portion of the U-shaped fluorescent discharge tube, and which is in point contact with the corresponding protrusion of the rear frame and the corresponding side surface of the rear frame.

6. The surface light source apparatus according to claim 5, wherein:
   (a) at least one of the middle frame and the rear frame has a convex portion at a position corresponding to the gap, and
   (b) the convex portion is inserted between the protrusion and the side surface of the rear frame.

7. The surface light source apparatus according to claim 5, wherein the protrusions of the rear frame include corresponding openings.

* * * * *